(12) United States Patent
Dolmatov

(10) Patent No.: US 7,862,792 B2
(45) Date of Patent: Jan. 4, 2011

(54) DIAMOND-CARBON MATERIAL AND A METHOD FOR THE PRODUCTION THEREOF

(75) Inventor: Valery Yurievich Dolmatov, ul. Glinki, 1-59, Pushkin, St. Petersburg (RU) 196601

(73) Assignees: Federal State Insitution "Federal Agency for Legal Protection of Military, Special and Dual Use Intellectual Activity Results" Under Ministry of Justics of the Russian Federation, Moscow (RU); Joint-Stock Company "Diamond Centre", St. Petersburg (RU); Valery Yurievich Dolmatov, St. Petersburg (RU)

( * ) Notice: Subject to any disclaimer, the term of this patent is extended or adjusted under 35 U.S.C. 154(b) by 0 days.

(21) Appl. No.: 12/087,279

(22) PCT Filed: Dec. 30, 2005

(86) PCT No.: PCT/RU2005/000685

§ 371 (c)(1),
(2), (4) Date: Jun. 30, 2008

(87) PCT Pub. No.: WO2007/078209

PCT Pub. Date: Jul. 12, 2007

(65) Prior Publication Data

US 2008/0317659 A1      Dec. 25, 2008

(51) Int. Cl.
*B01J 3/06* (2006.01)
*B22F 3/08* (2006.01)

(52) U.S. Cl. .................................. 423/446; 264/84

(58) Field of Classification Search .................. None
See application file for complete search history.

(56) References Cited

U.S. PATENT DOCUMENTS 4,483,836 A * 11/1984 Adadurov et al. ........... 423/290
5,482,695 A * 1/1996 Guschin et al. ............. 423/446
5,861,349 A * 1/1999 Vereschagin et al. .......... 501/86
5,916,955 A * 6/1999 Vereschagin et al. ........ 524/495

FOREIGN PATENT DOCUMENTS

WO       WO03086970      * 10/2003

OTHER PUBLICATIONS

Derwent Abstract for WO03086970; Derwent Acc. No. 2003-833687.*
Xu et al.; Effect of Heat Treatment on the Properties of Nano-Diamond Under Oxygen and Argon Ambient; Diamond and Related Materials; 11, 249-256; 2002.*
Merck index: Oxygen.*
Merck index: Oxygen; 2009.*

* cited by examiner

*Primary Examiner*—Melvin C Mayes
*Assistant Examiner*—Guinever S Gregorio
(74) *Attorney, Agent, or Firm*—James Creighton Wray; Meera P. Narasimhan

(57) ABSTRACT

The invention relates to carbon chemistry and is embodied in the form of a diamond-carbon material, in which carbon is contained in the form a diamond cubic modification and in a roentgen-amorphous phase at a ratio of (40-80):(60-20) in terms of a carbon mass, respectively, wherein the inventive material comprises 89.1-95.2 mass % carbon, 1.2-5.0 mass % nitrogen, 0.1-4.7 mass % oxygen and 0.1-1.5 mass % fire-resisting impurities. The inventive method for producing said material consisting in detonating, in a closed space of a carbon-inert gas medium, a carbon-containing oxygen-deficient explosive material, which is placed in a condensed phase envelop containing a reducing agent at a quantitative ratio between said reducing agent mass in the condensed phase and the mass of the used carbon-containing explosive material equal to or greater than 0.01:1. A method for processing the samples of diamond-carbon material produced by means of a detonation synthesis for examining the elemental composition thereof is also disclosed.

5 Claims, No Drawings

DIAMOND-CARBON MATERIAL AND A METHOD FOR THE PRODUCTION THEREOF

This application claims the benefit of PCT/RU2005/000685 filed Dec. 30, 2005, which is hereby incorporated by reference in its entirety.

BACKGROUND OF THE INVENTION

1. Field of the Invention

The invention refers to carbon chemistry, in particular to composite carbon-based materials, containing carbon of cubic diamond modification and x-ray amorphous phase, as well as to the technology of its production, in particular by detonation method of diamond-carbon based materials acquisition.

2. Prior Art

Various composite materials containing carbon in different phases and produced by means of detonation synthesis from carbon-containing explosive materials are known. For example, experts in the field of carbon chemistry are familiar with condensed carbon (CC), that is composite carbon-based material containing carbon in various modifications and also, depending on detonation conditions of carbon-based materials, containing or not containing carbon in cubic diamond phase. Such CC can be produced at detonation of carbon-containing explosive materials with negative oxygen balance in specific environment, under conditions that allow keeping condensed carbon materials of explosion.

(Lyamkin A. I., Petrov E. A., Ershov A. P. and others. Diamond acquisition from explosive materials, DAN USSR, 1988, t.302, p.611-613; Greiner N. R., Phillips D. S., Johnson F. J. D. Diamonds in detonation soot, Nature, 1988, vol. 333, p.440-442; Petrov V. A., Sakovich G. V., Brylyakov P. M. Diamonds keeping conditions at detonation, DAN USSR, 1990, t.313, N<<4, p.862-864; V. Y. Dolmatov. Superdispersed diamonds of detonation synthesis: characteristics and use, Chemistry progress, 2001 t.70 (7), p.687-708; V. Y. Dolmatov. Superdispersed diamonds of detonation synthesis, St. Petersburg, SPbGPU, 2003, 344 p).

It is known that production method of CC or diamond-carbon-base material may include blasting of carbon-containing material charge in various environments:

in gas environment, inert to carbon, for example in nitrogen environment, carbonic acid, light-end products of previous blast. (U.S. Pat. No. 5,916,955, CI);
in water foam (Petrov V. A., Sakovich G. V., Brylyakov P. M. Diamonds keeping conditions at detonation, DAN USSR, 1990, t.313, No4.p.862-964);
charge water irrigation (RU, 2036835, CI);
in water cover (U.S. Pat. No. 5,353,708. CI);
in ice (RU, 2230702, CI).

Out of all existing methods of carbon-containing explosive materials detonation, the most effective from the view point of CC and diamond modification output is charge blast in water or ice cover (V. Y. Dolmatov. Superdispersed diamonds of detonation synthesis. St. Petersburg, SPbGPU, 2003. 344 p; RU, 2230702, C).

The CC received is a nano-dispersed carbon-containing powder, possessing specific characteristics and structure. For example, CC is distinguished by high dispersion ability, wide specific surface, presence of newly created carbonic faulted structures, increased reactivity.

There is synthetic diamond-carbon-base material (US, 5.86L349A), consisting of grouped round and irregular shaped particles in diameters diapason not exceeding 0.1 м, where: a) element composition of mass. %: carbon from 75.0 to 90.0; hydrogen from 0.8 to 1.5; nitrogen from 0.8 to 4.5; oxygen—up to balance; b) phase composition, mass. %; amorphous carbon from 10 to 30, cubic modification diamond—up to balance: c) material porous structure, the volume of pores 0.6 to 1.0 $sm^3/gr$; d) material surface with existence of over 10-20% of surface of throwing, nitrite, primary and secondary hydroxyl groups, possessing various chemical shifts in the field of NMR spectrum and one or more oxy carboxylic functional groups, selected from the group consisting of carbonylic groups, carboxylic groups, guanine groups, hydroperoxide and lactones groups over 1-2% of material surface related to carbon atoms by noncompensated connections; and e) specific surface from 200 to 450 $gM^2/g$.

Above mentioned material is produced by detonation synthesis method in the closed volume of explosive charge, which mainly contains carbon-containing explosive material or mix of such material, possessing negative oxygen balance. The charge detonation is initiated in presence of carbon particles with concentration from 0.01 to 0.015 $kg/m^3$ in environment, consisting of oxygen from 0.1 to 6% in volume and gas. inert towards carbon, at temperature of from 303 to 363 K. (U.S. Pat. No. 5,861,349, A). This method is carried out in pressure chamber with charge of negative oxygen balance, consisting mainly of, at least, one carboncontaining solid explosive.

There is CC named "diamond-carbon material" (U.S. Pat. No. 5,916,955A), containing carbon, oxygen, hydrogen, nitrogen and various nonflammable impurities. It also contains cubic modification carbon, x-ray amorphous phase carbon and crystal non diamond modification carbon with carbon phase modification ratio, mass. %:

Cubic modification carbon (diamond phase) 30-75 x-ray amorphous carbon phase 10-15 crystal modification carbon and others, with the following elements composition, mass. %:

Carbon 84.0-89.0

Hydrogen 0.3-1.1

Nitrogen 3.1-4.3

Oxygen 2.0-7.1

Nonflammable impurities 2.0-5.0

Production method of above mentioned diamond-carbon material (U.S. Pat. No. 5,916,955A) includes the phase of charge detonation, consisting of carbon-bearing explosive, in the closed space in gas containing atmosphere, inert towards carbon, with detonation production phase that contains cubic modification carbon (diamond phase), x-ray amorphous carbon phase and crystal modification carbon. The cooling of detonation product is carried out with speed from 200 to 6000 degree/min, atmosphere contains gauzy environment, containing gases, created with explosion of primary charge of carbon containing material.

However, above mentioned methods of diamond-carbon material production possess low level of diamond-carbon material output—up to 7.8 mass. % and does not allow to get material with high efficacy of high quality, as due to low content of carbon—the most important element in diamond-carbon material—the end product contains large quantity of heteroatom, mainly oxygen, existing in form of lactone, etheric and aldehyde groups that leads to excessive chemical activity of diamond-carbon material. This fact increases possibility of destructive processes in compositions with use of diamond-carbon material, e.g. in polymerous and oil compositions, especially at elevated operating temperature.

SUMMARY OF THE INVENTION

The objective of this invention is to develop technology to produce diamond-carbon material, possessing predictable characteristics and predictable element composition with high contents of carbon in desired phase conditions.

During invention development the objective was set to develop the method of producing diamond-carbon material, possessing high concentration of carbon of desired modifications and desired phase composition from carbon-base material using detonation synthesis under conditions preventing oxidation of diamond-carbon material surface and providing safety of the acquired diamond phase. The objective was achieved through production of diamond-carbon material, containing carbon, hydrogen, nitrogen and oxygen. Its distinction is that material contains carbon in the form of diamond cubic modification and in x-ray amorphous phase with ratio (40-80):(60-20) according to carbon mass, respectively, and contains, mass. %

Carbon—89.1-95.2
Hydrogen—1.2-5.0
Nitrogen—2.1-4.8
Oxygen—0.1-4.7
Nonflammable impurities—0.1-1.5

The objective was achieved through development of a method of production of diamond-carbon material, containing detonation of carbon-containing explosive with negative oxygen balance in closed volume in gauzy environment inert towards carbon, in condensed phase surrounding, distinguished by carrying out detonation of carbon containing material explosive put into condensed phase cover, containing deoxidizer at quantitative ratio of deoxidizer mass in condensed phase to mass of the used carbon-containing explosive not less than 0.01:1, and receive product containing mass. %:

Carbon—89.1-95.2
Hydrogen—1.2-5.0
Nitrogen—2.1-4.8
Oxygen—0.1-4.7

Nonflammable impurities 0.1-1.5, containing diamond cubic modification carbon and x-ray amorphous phase carbon in ration (40-80):(60-20) mass. %, respectively.

It is reasonable, according to the invention, to use as deoxidizer organic or inorganic compounds, preferably those not containing hydrogen and halogen atoms.

The given objective was also achieved by development of a method of preparation of diamond-carbon material, achieved through detonation synthesis from carbon-bearing explosive method, to further examination of element compounds including conditioning of mentioned end product at 120-140° C. under vacuum 0.01-10.0 Pa during 3-5 hours and its following treatment at 1050-1200° C. by oxygen flow with speed providing its full burning during 40-50 s.

DETAILED DESCRIPTION OF PREFERRED EMBODIMENTS

The process of diamond-carbon material production according to the method of the invention can be separated into four stages.

1. Stage one. Detonational transformation of explosive carbon-containing material at blow up mainly takes place in the range of the charge volume, limited by its outside surfaces and charge surrounding environment particularities, do not influence the process of transformation.

According to research results, explosive materials with negative oxygen balance leads to creation of "extra" carbon, which remains in condensed form. Part of this "extra" carbon transfers into cubic modification diamond after explosion.

Charge placement into environment of liquid or solid aggregate condition, e.g. when blown up in the pool filled with water or ice that prevents detonation products throwout, creates conditions for increased length of existence of high pressure and temperature complex created at detonation, which is existent environment for diamond and liquid carbon.

Charge placement inside the condensed phase, both liquid or solid aggregate condition, containing cover, e.g. in form of ice or water also allows to keep the detonation products for longer time in the volume of primary charge, which leads to prolonged existence of plasma containing detonation products, and contributes to better transformation of "extra" carbon into diamond phase.

2. Stage two. This transformation stage starts after the detonation process is completed. It is very important to provide fast gas-dynamic cooling of detonation products for preservation of cubic modification diamonds, created in chemistry transformation zone.

It is known that due to explosion in vacuum, the fastest gas-dynamic cooling of detonation products takes place due to high speed of throwout. However, kinetic energy of detonation products transforms into heat energy as they blow the walls of the explosive chamber. Chamber temperature goes up fast achieving very high values and after calming down of all blows inside the chamber the temperature sets up for ~3500 K—close to detonation temperature. The cubic modification diamonds fully transform into graphite, as chamber pressure drops times faster than chamber temperature. After that all CC gasify due to prolonged influence of high temperatures. That is why cubic modification diamonds do not preserve in vacuum explosion. The slowest gas-dynamic cooling exists at detonation products throwout surrounded by massive ice or water covers. So, the maximum set temperature of detonation products does not exceed 500-800 K due to effective energy extraction by water (RU, 2230702, C; V. A. Mazanov, Macrokinetics of condensed carbon and detonational nanodiamond preservation in hermetic explosive chamber, solid body physics, 2004, t.46, iss.4, p.614-620).

The gas-dynamic cooling intensity of explosion in inert gas environment takes middle value between vacuum explosion and condensed phase, in form of water or ice, cover explosion, as speed of detonation products throwout in gas environment is lower than in vacuum but higher than in water and ice cover.

As CC existence is determined mainly by residual temperature in explosive chamber—the lower the temperature, the higher the diamond-carbon material output—then the use of condensed covers around the charge seems to be the best since they create the highest cooling rate.

3. Stage three of detonation synthesis of diamond-carbon material comes after shock waves reflection from the chamber walls: circulation of shock waves, spreading with supersonic speed and accompanied by processes of sharp increase of substance density, pressure and temperature, and turbulent mixing of detonation products with environment inside the chamber takes place. The maximum set temperature of environment inside the chamber depends on ration of explosive mass and gas components, i.e. chemical environment activity and gases' heat capacity.

4. Stage four. The environment, heated by explosion of carbon-containing explosive and limited by cool cover—is cooling intensively. After explosion and detonation products release, chamber contains both various kinds of gauzy products ($CO_2$, $CO$, $O_2$, $H_2$, $N_2$, $CH_4$, $NO$, $NO_2$, $NH_3$, $H_2O$), and highly dispersed suspension of CC particles possessing high radiate capability. Thus the process of such environment cooling is characterized by combined heat transfer through convection and emission.

Using the method of electroconductivity profile measurement they determined that time of cubic diamond modification formation does not exceed 0.2-0.5 mcs, which corresponds to the width of chemical reaction zone in mixed compositions of trinitrotoluene—cyclonite explosions, both pressed and lithium (Stayer A. M., Ershov A. P., Lyamkin A. I. Research on detonation transformation of condensed explosives by electroconductivity method. Physics of burn and explosion, 1984). As part of formed (in the first stage of detonation) solid CC particles transforms into gases under the influence of gauzy oxidizers formed by explosion: $CO_2$, $H_2O$, $CO$, $O_2$, $N_2O_3$, $NO_2$, we can talk about preserved particles)) CC that didn't succeed to gasify, including due to lack of above mentioned oxidizers number.

Any non responsive solid particles of CC carbon have functional group cover. Thus interaction of surface functional groups with gauzy oxidizers is capable of changing primary functional groups, including non oxygen containing for oxygen containing, as all oxidizers contain oxygen.

The use of important deoxidizer function—tie oxidizer, preventing carbon oxidation, creates conditions for preventing carbon particle surfaces from oxidation. Thus, creating conditions for considerable increase of carbon content in diamond-carbon material. This increase is being achieved through decrease in oxygen content, as following research results, content of nitrogen and hydrogen changes insufficiently.

We should also note the fact that high content of oxygen in diamond-carbon materials prevents it from efficient use in some technologies. For example, when using diamond-carbon material as additives to oil, availability of large quantity of oxygen increases oxidizing capability of material.

Maximum output of CC—12%—is achieved by explosion of carbon-containing material in gas chamber under conditions of set temperature of 1500±150 K. Increasing the temperature in the chamber till 3000-3500 K we will decrease the output till zero. (V. A. Mazanov. Macrokinetics of condensed carbon and detonational nanodiamond preservation in hermetic explosive chamber, solid body physics, 2004, t.46, iss.4, p.614-620).

Preservation possibility of received diamonds of cubic modification and elemental composition of diamond-carbon material depends on intensity of hetero-phase endothermic reactions of CC gasification by carbon dioxide (1) and water steam (2) behavior in gas chamber that can be presented as single gross-reaction (3):

  (1)

  (2)

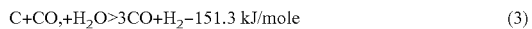  (3)

Two competing processes occur in explosive chamber under high temperature: CC gasification—non-diamond carbon in the first turn as more active, and graphitization of formed diamonds of cubic modification.

Thus authors found it reasonable to develop conditions of synthesis carrying out what would provide minimal influence possibilities of detonation products onto received, at detonation, product and maximum possible speed of product cooling to prevent its gasification. Following invention, the input of deoxidizer into condensed cover of the charge allows achieving several effects:

1. Deoxidizer prevents carbon particles surface from oxidation in the third stage of detonation process, by tying oxidizers as the most active chemical components inside the chamber. As a result, content of the main heteroatom-oxygen, preventing further use of CC, sharply drops till 0.1%, and its place is taken by quite inert and neutral hydrogen. Carbon content increases to 95.2%.

2. The chamber temperature drops sharply due to partial decomposition of oxidizer under high temperatures, which in turn, decreases gasification process (reactions 1-3) and "freezes" phase transformation diamond-graphite.

Thus deoxidizer input allows increasing CC output.

Current invention can be illustrated by examples of implementation of diamond-carbon material production method according to the invention.

Mixed carbon-containing explosives are usually used for CC synthesis, e.g. mix of trinitrotoluene and hexogen or octogen with trinitrotoluene content from 30 to 70%. It is also possible to use trinitrotriaminbenzol mixed with trinitrotoluene, hexogen or octogen. The following was chosen for tests of carbon containing explosives:

charges from mix of trinitrotoluene and hexogen, formed by pressing under pressure of 1500 kg/sm² with ratio 50/50 (examples 1-18) and melting with ratio 65/35 (examples 19, 20);

charges from mix of trinitrotoluene and octogen, formed by pressing under pressure of 1500 kg/sm² with ratio 60/40 (example 21);

charges from mix of trinitrotriaminbenzol and octogen, formed by pressing under pressure of 1500 kg/sm² with ratio 50/50 (example 22). Traditional charge form was chosen—solid cylinder, and cylindrical cartridge diameter—48.5 mm, charge length—167.1 mm.

Charge blasting was realized using electrodetonator, located from the butt end inside the charge.

The charge of carbon-containing explosive was put into condensed phase cover—solution of deoxidizer in water in liquid aggregate condition (examples 1-16,18,19,21,22) or in ice condition (example 20), or in cover produced as charge armor from pressed solid deoxidizer (example 17). The cover mass is from 4.0 to 6.0 kg. The covers, in liquid aggregate conditions, were cylindrical polyethylene bags, tilled with condensed phase of deoxidizer solution and charge, hanged inside the bag. In case of solid aggregate condition of the cover with use of adamantan as deoxidizer, the cover looked like outer armor over entire surface.

The following was used as deoxidizers: dimethylhydrazine (examples 1-5, 19), urotropine (examples 6-10, 20-22), ammonia (examples 11-13), carbamide (examples 14-16), adamantan (example 17), acentonitrile (example 18) with different, in range of (0.01-10.0):1.0, correlation of mass of used deoxidizer and mass of used explosive correspondingly.

The tests were carried out the following way: covered charge was placed into explosive chamber through upper hatch. The explosive chamber is made of stainless steel, volume of 1 m³, filled with gauzy products of previous blasting. The chamber was closed then and charge blasted.

In three minutes after blast the unloading of received water suspension was realized through the lower valve into receiving capacity. Water suspension then was passed through 200 mcm sell sieve and dried. Dried product was crushed and sifted through 80 mcm sell sieve and afterwards the samples of the received product were prepared for further research of their elemental composition according to invention method. For this purpose samples of received products were sustained at 120-140° C. temperature in vacuum 0.01-10.0 Pa for 3-5 hours and undergo treatment by the oxygen flow under the temperature of 1050-1200° C. with speed providing its burning for 40-50 sec.

Researches have determined that diamond-carbon material contains from 8 to 14 mass % of volatile impurity (mainly water, nitrogen oxides and hydrogen oxides). Removal of such impurities, hardly tied by adsorptive forces in micropore, by ordinary air heating at temperatures 120-125° C. is impossible.

Heating temperature increase to higher temperatures is dangerous due to decomposition and flammability of particles of non diamond carbon. To completely remove volatile impurities one should use vacuum with residual pressure 0.01-10.0 Pa. The temperature should be kept in the range 120-140° C.

Temperature 120° C. is sufficient in vacuum 0.01 Pa, and 140° C. in 10.0 Pa vacuum. It is unreasonable to maintain pressure less than 0.01 Pa due to economical reasons, and higher than 10.0 Pa—due to the possibility of not completely removing volatile impurities. Increasing temperature beyond 140° C. may cause decomposition of part of unstable non-diamond carbon. The heating time of 3-5 hours guarantees complete removal of volatile impurities. Three hours is enough at 0.01 Pa and 120° C., whereas five hours are needed at 10.0 Pa and 140° C.

The standard methodology from organic chemistry is usually used to determine elemental composition of diamond-carbon material: heating temperature in oxygen flow is 850-900° C. during 5 s. However diamond-carbon material differs a lot by its resistance towards oxidation from any organic compounds. Thus conditions stated above are not enough for complete oxidation of the elements forming diamond-carbon material. The temperature providing full oxidation (burn) of diamond-carbon material is 1050-1200° C., and heating time to be 40-50 seconds. These conditions can be achieved using device JYo 185 of "Hewlett Packard" (USA).

Samples of synthesis products, prepared by method described above undergo the following tests:

Research using small-angle dispersion method for determination of quantitative distribution of particles of material over its size;

Research using polarographic titration for determination of existence and composition of surface, oxygen-containing, amine and amide functional groups. The amine, amide, hydroxyl, carboxyl groups are identified by value of corresponding reduction potentials and IR-spectroscopy data;

Research using gas-chromatographic analysis for existence of surface throwing groups, identified by composition of emitted gas at heating, at temperature 663-673 K during 3 hours, per quantity of emitted methane. The achieved products were heated at 473 K in vacuum (0.1 Pa) until achieving the product of constant weight (during 24 hours) before gas-chromatographic analysis. During the heating process previously absorbed by received product surface volatile products, including gases, were eliminated, and emitted at gas-chromatographic analysis gases $CH_4$, $H_2$, $CO_2$, $CO$, $O_2$, $N_2$ and $NH_3$ were gases forming at destruction of chemically connected with CC surface groups;

Research using x-ray photoelectron spectroscopy (XPES) to analyze the distribution of carbon forms in achieved product;

Research using small-angle dispersion method (Svergoon D. I., Feigin L. A. x-ray and neutron small-angle dispersion, Moscow, izd <<Nauka>>, 1986, 280 p);

Research using determination of specific surface using powder means of low-temperature sorption nitrogen method (further BET) (Gerasimov Y. M. and others. Physical Chemistry. T. l, edition 2., Moscow, izd. <<Chemistry>>, 1969, p. 592).

Research results are shown in the Table.

TABLE

Production of diamond-carbon materials according to invention by the means of invention

| Acquisition method | | | Example No. | | |
|---|---|---|---|---|---|
| components | Item | Parameters | 1 | 2 | 3 |
| A. Explosive | 1 | Composition | Trinitrotoluol/hexogene, 50/50, pressed | Trinitrotoluol/hexogene, 50/50, pressed | Trinitrotoluol/hexogene, 50/50, pressed |
| | 2 | Mass, kg | 0.5 | 0.5 | 0.5 |
| | 3 | Density, g/cm³ | 1.62 | 1.62 | 1.62 |
| B. Shell | 4 | Deoxidant | dimethylhydrazine | dimethylhydrazine | dimethylhydrazine |
| | 5 | Weight ratio of the deoxidant to the explosive | 0.32:1.00 | 0.01:1.00 | 0.16:1.0 |
| | 6 | Solvent | water | water | water |
| | 7 | Shell aggregate state | liquid | liquid | liquid |
| | 8 | Mass, kg | 4.0 | 4.0 | 4.0 |
| C. Derived product | 9 | CC output, mass. % | 15.2 | 12.1 | 14.0 |
| | 10 | Component composition, mass %: | | | |
| | | [C] | 91.4 | 90.9 | 91.8 |
| | | [H] | 3.1 | 1.2 | 2.2 |
| | | [N] | 3.2 | 2.1 | 3.0 |
| | | [O] | 0.6 | 1.0 | 1.1 |
| | | Nonflammable impurities | 1.7 | 4.8 | 1.9 |

TABLE-continued

Production of diamond-carbon materials according to invention by the means of invention

| Acquisition method components | Item | Parameters | | | |
|---|---|---|---|---|---|
| | 11 | Phase composition, mass %: | | | |
| | | cubic diamond carbon, | 60 | 58 | 68 |
| | | X-ray amorphous carbon phase | 40 | 42 | 32 |
| | 12 | Surface groups composition | methyl, hydroxyl, carboxyl, amine, amide, carbonyl | methyl, hydroxyl, carboxyl, amine, carbonyl | methyl, hydroxyl, carboxyl, amine, carbonyl |

| Acquisition method components | Item | Parameters | Example No. 4 | Example No. 5 | Example No. 6 |
|---|---|---|---|---|---|
| A. Explosive | 1 | Composition | Trinitrotoluol/hexogene, 50/50, pressed | Trinitrotoluol/hexogene, 50/50, pressed | Trinitrotoluol/hexogene, 50/50, pressed |
| | 2 | Mass, kg | 0.5 | 0.5 | 0.5 |
| | 3 | Density, g/cm³ | 1.62 | 1.62 | 1.62 |
| B. Shell | 4 | Deoxidant | dimethylhydrazine | dimethylhydrazine | urotropine |
| | 5 | Weight ratio of the deoxidant to the explosive | 0.64:1.00 | 10.0:1.00 | 0.01:1.00 |
| | 6 | Solvent | water | water | water |
| | 7 | Shell aggregate state | liquid | liquid | liquid |
| | 8 | Mass, kg | 4.0 | 4.0 | 6.0 |
| C. Derived product | 9 | CC output, mass. % | 16.1 | 14.1 | 12.6 |
| | 10 | Component composition, mass %: | | | |
| | | [C] | 90.7 | 89.1 | 92.9 |
| | | [H] | 2.5 | 5.0 | 1.8 |
| | | [N] | 3.1 | 4.2 | 2.7 |
| | | [O] | 1.5 | 0.1 | 0.6 |
| | | Nonflammable impurities | 2.2 | 1.6 | 2.1 |
| | 11 | Phase composition, mass %: | | | |
| | | cubic diamond carbon, | 63 | 61 | 66 |
| | | X-ray amorphous carbon phase | 37 | 39 | 34 |
| | 12 | Surface groups composition | methyl, hydroxyl, amine, amide, carbonyl | methyl, hydroxyl, amine, amide | methyl, hydroxyl, carboxyl, amine, carbonyl |

| Acquisition method components | Item | Parameters | Example No. 7 | Example No. 8 | Example No. 9 |
|---|---|---|---|---|---|
| A. Explosive | 1 | Composition | Trinitrotoluol/hexogene, 50/50, pressed | Trinitrotoluol/hexogene, 50/50, pressed | Trinitrotoluol/hexogene, 50/50, pressed |
| | 2 | Mass, kg | 0.5 | 0.5 | 0.5 |
| | 3 | Density, g/cm³ | 1.62 | 1.62 | 1.62 |
| B. Shell | 4 | Deoxidant | urotropine | urotropine | urotropine |
| | 5 | Weight ratio of the deoxidant to the explosive | 0.25:1.0 | 0.50:1.00 | 1.0:1.0 |
| | 6 | Solvent | water | water | water |
| | 7 | Shell aggregate state | liquid | liquid | liquid |
| | 8 | Mass, kg | 6.0 | 6.0 | 6.0 |

TABLE-continued

Production of diamond-carbon materials according to invention by the means of invention

| Acquisition method components | Item | Parameters | | | |
|---|---|---|---|---|---|
| C. Derived product | 9 | CC output, mass. % | 14.6 | 15.55 | 16.05 |
| | 10 | Component composition, mass %: | | | |
| | | [C] | 94.1 | 91.2 | 92.8 |
| | | [H] | 1.6 | 3.0 | 2.8 |
| | | [N] | 2.2 | 2.6 | 2.7 |
| | | [O] | 0.5 | 0.9 | 0.3 |
| | | Nonflammable impurities | 1.6 | 2.3 | 1.4 |
| | 11 | Phase composition, mass %: | | | |
| | | cubic diamond carbon, | 71 | 74 | 75 |
| | | X-ray amorphous carbon phase | 29 | 26 | 25 |
| | 12 | Surface groups composition | methyl, hydroxyl, amine, carbonyl | methyl, hydroxyl, amine, amide | methyl, hydroxyl, amine, amide |

| Acquisition method components | Item | Parameters | Example No. 10 | Example No. 11 | Example No. 12 |
|---|---|---|---|---|---|
| A. Explosive | 1 | Composition | Trinitrotoluol/hexogene, 50/50, pressed | Trinitrotoluol/hexogene, 50/50, pressed | Trinitrotoluol/hexogene, 50/50, pressed |
| | 2 | Mass, kg | 0.5 | 0.5 | 0.5 |
| | 3 | Density, g/cm$^3$ | 1.62 | 1.62 | 1.62 |
| B. Shell | 4 | Deoxidant | urotropine | ammonia | ammonia |
| | 5 | Weight ratio of the deoxidant to the explosive | 10.0:1.00 | 0.01:1.0 | 0.50:1.0 |
| | 6 | Solvent | water | water | water |
| C. Derived product | 7 | Shell aggregate state | suspension | liquid | liquid |
| | 8 | Mass, kg | 6.0 | 5.0 | 5.0 |
| | 9 | CC output, mass. % | 16.2 | 11.6 | 13.4 |
| | 10 | Component composition, mass %: | | | |
| | | [C] | 94.7 | 91.5 | 91.1 |
| | | [H] | 1.5 | 2.3 | 3.0 |
| | | [N] | 2.2 | 2.2 | 2.8 |
| | | [O] | 0.1 | 1.4 | 0.9 |
| | | Nonflammable impurities | 1.5 | 2.6 | 2.2 |
| | 11 | Phase composition, mass %: | | | |
| | | cubic diamond carbon, | 69 | 52 | 51 |
| | | X-ray amorphous carbon phase | 31 | 48 | 49 |
| | 12 | Surface groups composition | methyl, hydroxyl, amine, carbonyl | methyl, hydroxyl, carboxyl, carbonyl | methyl, hydroxyl, carboxyl, amine, amide, carbonyl |

| Acquisition method components | Item | Parameters | Example No. 13 | Example No. 14 | Example No. 15 |
|---|---|---|---|---|---|
| A. Explosive | 1 | Composition | Trinitrotoluol/hexogene, 50/50, pressed | Trinitrotoluol/hexogene, 50/50, pressed | Trinitrotoluol/hexogene, 50/50, pressed |
| | 2 | Mass, kg | 0.5 | 0.5 | 0.5 |
| | 3 | Density, g/cm$^3$ | 1.62 | 1.62 | 1.62 |

TABLE-continued

Production of diamond-carbon materials according to invention by the means of invention

| | | | | | | |
|---|---|---|---|---|---|---|
| B. Shell | 4 | Deoxidant | ammonia | carbamide | carbamide |
| | 5 | Weight ratio of the deoxidant to the explosive | 1.0:1.0 | 10.0:1.00 | 0.4:1.0 |
| | 6 | Solvent | water | water | water |
| | 7 | Shell aggregate state | liquid | liquid | liquid |
| | 8 | Mass, kg | 5.0 | 5.0 | 5.0 |
| C. Derived product | 9 | CC output, mass. % | 13.1 | 12.9 | 14.7 |
| | 10 | Component composition, mass %: | | | |
| | | [C] | 90.4 | 90.8 | 90.1 |
| | | [H] | 3.2 | 2.6 | 3.0 |
| | | [N] | 3.3 | 2.6 | 2.6 |
| | | [O] | 1.0 | 1.7 | 2.2 |
| | | Nonflammable impurities | 2.1 | 2.3 | 2.1 |
| | 11 | Phase composition, mass %: | | | |
| | | cubic diamond carbon, | 49 | 58 | 61 |
| | | X-ray amorphous carbon phase | 51 | 42 | 39 |
| | 12 | Surface groups composition | methyl, hydroxyl, carboxyl amine, amide, carbonyl | methyl, hydroxyl, carboxyl carbonyl | methyl, hydroxyl, carboxyl amine, carbonyl |

| Acquisition method components | Item | Parameters | Example No. 16 | Example No. 17 | Example No. 18 |
|---|---|---|---|---|---|
| A. Explosive | 1 | Composition | Trinitrotoluol/hexogene, 50/50, pressed | Trinitrotoluol/hexogene, 50/50, pressed | Trinitrotoluol/hexogene, 50/50, pressed |
| | 2 | Mass, kg | 0.5 | 0.5 | 0.5 |
| | 3 | Density, g/cm$^3$ | 1.62 | 1.62 | 1.62 |
| B. Shell | 4 | Deoxidant | carbamide | adamantane | acentonitrile |
| | 5 | Weight ratio of the deoxidant to the explosive | 10.0:1.00 | 1.4:1.0 | 2.0:1.00 |
| | 6 | Solvent | water | — | water |
| | 7 | Shell aggregate state | liquid | pressed solid | liquid |
| C. Derived product | 8 | Mass, kg | 5.0 | charge inhibitor | 5.0 |
| | 9 | CC output, mass. % | 13.5 | 15.8 | 14.3 |
| | 10 | Component composition, mass %: | | | |
| | | [C] | 89.5 | 95.2 | 91.9 |
| | | [H] | 1.3 | 1.2 | 1.3 |
| | | [N] | 2.1 | 2.1 | 4.8 |
| | | [O] | 4.7 | 0.1 | 0.4 |
| | | Nonflammable impurities | 2.4 | 1.4 | 1.6 |
| | 11 | Phase composition, mass %: | | | |
| | | cubic diamond carbon, | 40 | 80 | 56 |
| | | X-ray amorphous carbon phase | 60 | 20 | 44 |
| | 12 | Surface groups composition | methyl, hydroxyl, amine, amide, carbonyl | methyl, hydroxyl, amine, amide, carbonyl | methyl, hydroxyl, amine |

TABLE-continued

Production of diamond-carbon materials according to invention by the means of invention

| Acquisition method components | Item | Parameters | Example No. 19 | Example No. 20 | Example No. 21 |
|---|---|---|---|---|---|
| A. Explosive | 1 | Composition | Trinitrotoluol/hexogene, 65/35 melted | Trinitrotoluol/hexogene, 65/35, melted | Trinitrotoluol/octogene, 60/40, compacted |
| | 2 | Mass, kg | 0.51 | ~0.51 | ~0.51 |
| | 3 | Density, g/cm$^3$ | 1.64 | 1.64 | 1.65 |
| B. Shell | 4 | Deoxidant | dimethylhydrazine | urotropine | urotropine |
| | 5 | Weight ratio of the deoxidant to the explosive | 0.64:1.0 | 0.5:1.0 | 0.5:1.0 |
| | 6 | Solvent | water | water | water |
| | 7 | Shell aggregate state | liquid | ice | liquid |
| C. Derived product | 8 | Mass, kg | 4.0 | 6.0 | 6.0 |
| | 9 | CC output, mass. % | 16.9 | 16.5 | 16.8 |
| | 10 | Component composition, mass %: | | | |
| | | [C] | 91.4 | 93.0 | 93.1 |
| | | [H] | 2.4 | 1.3 | 1.4 |
| | | [N] | 2.3 | 2.2 | 2.5 |
| | | [O] | 1.2 | 0.4 | 1.1 |
| | | Nonflammable impurities | 2.7 | 3.1 | 1.9 |
| | 11 | Phase composition, mass %: | | | |
| | | cubic diamond carbon, | 69 | 78 | 79 |
| | | X-ray amorphous carbon phase | 31 | 22 | 21 |
| | 12 | Surface groups composition | methyl, hydroxyl, carboxyl, amine, amide, carbonyl | methyl, hydroxyl, amine, carbonyl | methyl, hydroxyl, carboxyl, amine, carbonyl |

| Acquisition method components | Item | Parameters | Example No. 22 |
|---|---|---|---|
| A. Explosive | 1 | Composition | Triaminotrinitrobenzol/octogene, 50/50, pressed |
| | 2 | Mass, kg | 0.53 |
| | 3 | Density, g/cm$^3$ | 1.71 |
| B. Shell | 4 | Deoxidant | urotropine |
| | 5 | Weight ratio of the deoxidant to the explosive | 0.5:1.0 |
| | 6 | Solvent | water |
| | 7 | Shell aggregate state | liquid |
| C. Derived product | 8 | Mass, kg | 6.0 |
| | 9 | CC output, mass. % | 13.1 |
| | 10 | Component composition, mass %: | |
| | | [C] | 90.0 |
| | | [H] | 2.3 |
| | | [N] | 2.9 |
| | | [O] | 2.1 |
| | | Nonflammable impurities | 2.7 |

TABLE-continued

Production of diamond-carbon materials according to invention by the means of invention

| | 11 | Phase composition, mass %: | |
|---|---|---|---|
| | | cubic diamond carbon, | 52 |
| | | X-ray amorphous carbon phase | 48 |
| | 12 | Surface groups composition | methyl, hydroxyl, carboxyl, amine, carbonyl |

Researches have discovered that diamond-carbon material, produced by method of invention is black color powder possessing the following characteristics:

specific surface from 150 to 550 m/g, determined using specific surface using powder means of low-temperature sorption nitrogen method (further BET) (Gerasimov Y. M. and others. Physical Chemistry. T. l, edition 2., Moscow, izd. <<Chemistry>>, 1969, p. 592).

average particles size 2-6 nm, determined using small-angle dispersion method, specific weight in range of 2.0-2.6 g/sm$^3$.

Content of non flammable particles in achieved product, mainly oxides and carbides of metals, depends on conditions of detonation synthesis, explosive chamber walls material structure and level of wear-out of this chamber, and may amount to 1.4-4.8 mass. %. Research shows that x-ray pictures of examined samples of diamond-carbon material contains, alone with three lines referring to diamond phase of carbon, also the wide maximum with d=0.42 nm, referring to x-ray amorphous phase of carbon. Existence of the last maximum is clearly seen after partial oxidation of CC either by oxygen of air at temperature of 673 K during 1-5 hours, or at etching by 98% nitric acid while boiling for 3-8 hours.

Material particles distribution was examined using the method of law-angle dispersion. Research shows that distribution over size of particles is characterized by single maximum in between 40 and 60 A, i.e. carbon phases do not differ by particle size.

IR-specters allowed identifying of hydroxyl, carboxyl, carbonyl, amine and amide groups on surface of CC particles.

The gas-chromatographic analysis shows that the following gases emission from the sample mass 1.0 g heated in vacuum at 663-673 K for 3 hours:

methane—0.12-0.60 sm$^3$/g,
hydrogen—0.18-0.33 sm$^3$/g,
carbon dioxide—0.01-0.46 sm$^3$/g,
carbon oxide—0.01-0.13 sm$^3$/g,
oxygen—0.00-0.02 sm$^3$/g,
nitrogen—0.39-2.04 sm$^3$/g,
ammonia—0.06-0.21 sm$^3$/g.

Overall gas emission is 0.82-3.22 sm$^3$/g.

Based on received data we can conclude that the following surface groups exist on the surface of produced CC: methyl (methane emission), carboxyl (emission of carbon dioxide and oxide), amine (ammonia emission), amide, carbonyl, hydroxyl.

Based on polarographic titration they determined existence of carboxyl groups on many samples and carbonyl groups on some samples. Experts in the field of nano-diamonds are well aware that oxidants etching is layerwise removal of material from the surface of diamond-carbon material particle when treated by strong oxidizers. Oxygen and hydrogen are located in the upper layers of the particles, i.e. at layerwise removal of material their percentage will reduce in the part of material retained after etching, but percentage of carbon will increase. Nitrogen percentage will not change since it is evenly distributed over the particle.

Thus, no oxidation etching of diamond-carbon material particles changes percentage of nitrogen in the remaining material. Moreover, unlike known diamond-carbon material described above (U.S. Pat. No. 5,916,955, A), nitrogen is spread evenly over the volume of diamond phase of carbon and x-ray amorphous phase of carbon. Based on data shown in Table we can conclude that: 1. Existence of deoxidizer in condensed phase covers quantity from 0.01 mass. % to 10 mass. % in regards to the mass of used explosive had reasonable positive effect for the essential change of elemental composition: carbon more than 91.5 mass. %. hydrogen more than 1.5 mass. %, oxygen—less than 1.5 mass. %, nitrogen—in scope of 2.2-2.9 mass. %.

Deoxidizer input in quantity exceeding 10 times the mass of explosive is economically unreasonable. The maximum value of CC output and concentration of carbon in it is achieved at 1:10 ratio of explosive and deoxidizer mass. Further increase of deoxidizer mass will lead to technical complicacy towards diamond-carbon material extraction from chamber and its processing.

Physicochemical properties of diamond-carbon materials produced by the method and in accordance to the invention allow using them as nanosize component of highly effective composite materials. Parallel testing was carried out as to use of diamond-carbon materials produced by different methods. The oils for submersible pumps were produced with use of the following as additives:

A) diamond-carbon material received by method and according to invention containing, mass, %: carbon 94.5%, hydrogen—1.2%, nitrogen—2.5%, oxygen—0.8%, Non-flammable impurities—1.0% containing carbon in diamond cubic modification—72% and carbon in x-ray amorphous modification—28%.

B) diamond-carbon materials produced by detonation method described above (U.S. Pat. No. 5,916,955, A), having the following structure, mass. %: carbon 88.8%, hydrogen—1.1%, nitrogen—3.1%, oxygen—4.9%, Nonflammable impurities—2.1%, containing in carbon mass: carbon in diamond cubic phase—42% and in other forms of carbon—58%.

The parallel test results show that use of oils with additives from material B in submersible pumps at closed cycle of oil flow resulted in full oil resinification for 18 hours of operation and failure of the pump due to catastrophic wear off of surfaces.

The use of oils with additives from material A of the present invention did not result in oil resinification and condensation (adhesion) of diamond particles with a following wear off of the surface. Thus, diamond-carbon materials according to this invention, produced by the method of detonation synthesis according to this invention, possess better elemental and phase composition than known diamond-carbon material that leads to more stable predictable characteristics of the compositions and materials for their use in various fields of science and technology.

INDUSTRIAL APPLICABILITY

Diamond-carbon materials according to this invention can find wide application in various technologies, e.g. In polishing-finishing compositions, film coating, in composition of radiation-resistant materials. Diamond-carbon materials according to invention can be produced by method according to invention, which can be carried out using existing technological equipment and available explosives.

The invention claimed is:

1. Diamond-carbon material comprising carbon, hydrogen, nitrogen, and oxygen wherein the carbon is in a form of diamond cubic modification and in x-ray amorphous phase with a ratio (40-80):(60-20) of mass of carbon, respectively, and wherein a mass % is:
   Carbon 91.5-95.2
   Hydrogen 1.2-5.0
   Nitrogen 2.1-4.8
   Oxygen 0.1-4.7, and
   Nonflammable impurities 0.1-1.5.

2. A method of production of diamond-carbon material comprising:
   detonating carbon-containing explosive with negative oxygen balance in a closed volume in gaseous environment being inert in relation to carbon,
   surrounding carbon-containing explosive by condensed phase and providing containing required amount of deoxidizer
   a ratio of the deoxidizer in the condensed phase to mass of the carbon-containing explosive used being not less than 0.01:1, respectively, and
   producing the diamond-carbon material comprising mass %:
   Carbon 91.5-95.2
   Hydrogen 1.2-5.0
   Nitrogen 2.1-4.8
   Oxygen 0.1-4.7, and
   nonflammable impurities 0.1-1.5 containing diamond cubic modification carbon and x-ray amorphous phase carbon in a ratio (40-80):(60-20) mass % respectively.

3. The method of claim 2, wherein the deoxidizers are inorganic or organic compositions.

4. The method of claim 3, wherein the composition does not comprise elements selected from the group consisting of oxygen, halogen, and combinations thereof.

5. A method of preparation of diamond-carbon material comprising producing the diamond-carbon material containing diamond cubic modification carbon and x-ray amorphous phase carbon in a ratio (40-80):(60-20) mass % respectively, by detonation synthesis of carbon-containing explosive, determining an elemental structure of the diamond-carbon material, conditioning the diamond-carbon material at temperatures 120-140° C. in vacuum 0.01-10.0 Pa for 3-5 hours, treating under temperatures 1050-1200° C. by flowing oxygen with speed, and burning in 40-50 c, and producing the diamond-carbon material comprising mass %:
   Carbon 91.5-95.2
   Hydrogen 1.2-5.0
   Nitrogen 2.1-4.8
   Oxygen 0.1-4.7, and
   nonflammable impurities 0.1-1.5 containing diamond cubic modification carbon and x-ray amorphous phase carbon in a ratio (40-80):(60-20) mass %, respectively.

* * * * *